(12) United States Patent
Bhooma (10) Patent No.: US 9,247,449 B2
(45) Date of Patent: *Jan. 26, 2016

(54) REDUCING INTERARRIVAL DELAYS IN NETWORK TRAFFIC

(71) Applicant: Apple Inc., Cupertino, CA (US)

(72) Inventor: Padmavathy Bhooma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/206,991

(22) Filed: Mar. 12, 2014

(65) Prior Publication Data

US 2014/0192649 A1 Jul. 10, 2014

Related U.S. Application Data

(63) Continuation of application No. 13/399,860, filed on Feb. 17, 2012, now Pat. No. 8,699,339.

(51) Int. Cl.
| | |
|---|---|
| H04W 28/02 | (2009.01) |
| H04W 28/10 | (2009.01) |
| H04L 12/24 | (2006.01) |
| H04L 12/26 | (2006.01) |
| H04L 12/807 | (2013.01) |
| H04L 12/841 | (2013.01) |
| H04L 29/06 | (2006.01) |
| H04L 12/851 | (2013.01) |
| H04L 12/801 | (2013.01) |

(52) U.S. Cl.
CPC ....... *H04W 28/0236* (2013.01); *H04L 41/5022* (2013.01); *H04L 43/087* (2013.01); *H04L 47/11* (2013.01); *H04L 47/14* (2013.01); *H04L 47/24* (2013.01); *H04L 47/27* (2013.01); *H04L 47/283* (2013.01); *H04L 69/163* (2013.01); *H04W 28/10* (2013.01); *H04L 47/12* (2013.01)

(58) Field of Classification Search
CPC ......... H04L 47/11; H04L 47/12; H04L 47/14; H04L 47/27283; H04L 47/24; H04L 41/5022; H04L 43/087; H04L 69/163; H04W 28/02; H04W 28/10; H04W 28/36
USPC .................. 370/232–329; 709/235
See application file for complete search history.

(56) References Cited

U.S. PATENT DOCUMENTS

| | | | |
|---|---|---|---|
| 7,516,238 B2 | 4/2009 | Key et al. | |
| 8,699,339 B2 * | 4/2014 | Bhooma | 370/232 |
| 2007/0280111 A1 * | 12/2007 | Lund | 370/235 |

* cited by examiner

*Primary Examiner* — Afsar M Qureshi
(74) *Attorney, Agent, or Firm* — Sterne, Kessler, Goldstein & Fox P.L.L.C.

(57) ABSTRACT

The disclosed embodiments provide a system that facilitates use of a network link. During operation, the system continuously monitors an interarrival delay of packets received from a sender over the network link. Next, the system adjusts a receive window for the sender based on the interarrival delay to facilitate receipt of subsequent packets from the sender and other senders over the network link.

24 Claims, 6 Drawing Sheets

REDUCING INTERARRIVAL DELAYS IN NETWORK TRAFFIC

RELATED APPLICATION

The instant application is a continuation of, and hereby claims priority under 35 U.S.C. §120 to, pending U.S. patent application Ser. No. 13/399,860, by inventor Padmavathy Bhooma, for "Reducing Interarrival Delays in Network Traffic," which was filed on 17 Feb. 2012, and which is incorporated by reference.

BACKGROUND

1. Field

The disclosed embodiments relate to techniques for managing network traffic. More specifically, the disclosed embodiments relate to techniques that reduce interarrival delays in network traffic by adjusting, based on the interarrival delays, receive windows for senders associated with the network traffic.

2. Related Art

Network links such as wireless access points, cell towers, and/or routers may be shared by a number of network-enabled electronic devices such as personal computers, laptop computers, mobile phones, portable media players, printers, and/or video game consoles. To manage network traffic to the electronic devices, the network links may reduce the flow of packets to the electronic devices, reorder the packets, and/or drop the packets. Senders of the packets may also adjust the rate of transmission of subsequent packets based on packet errors, losses, and/or delays, thus lifting congestion at the network links and facilitating sharing of the network bandwidth by the electronic devices.

On the other hand, the electronic devices may lack the ability to influence the transmission of packets from the senders. Instead, the electronic devices may only receive the packets at the rate at which the packets are transmitted by the senders and/or network links. Moreover, each electronic device may include a number of processes associated with different priorities that send and receive data over the same network link(s). Because the senders and network links lack priority information for the processes, higher-priority (e.g., foreground) processes on the electronic device may end up with a smaller share of bandwidth on the network link than lower-priority (e.g., background) processes, which may adversely affect the use of the electronic device by a user.

SUMMARY

The disclosed embodiments provide a system that facilitates use of a network link. During operation, the system continuously monitors an interarrival delay of packets received from a sender over the network link. Next, the system adjusts a receive window for the sender based on the interarrival delay to facilitate receipt of subsequent packets from the sender and other senders over the network link.

In some embodiments, the system also adjusts the receive window based on a priority of a process associated with the packets. For example, the system may scale an adjustment to the receive window based on the priority of the process. A higher-priority process such as a foreground process may thus be associated with smaller adjustments to the receive window than a lower-priority process such as a background process.

In some embodiments, adjusting the receive window for the sender based on the interarrival delay involves reducing the receive window if the interarrival delay exceeds a threshold by a first pre-specified margin, and increasing the receive window if the interarrival delay falls below the threshold by a second pre-specified margin.

In some embodiments, adjusting the receive window for the sender involves transmitting an acknowledgement packet (e.g., Transmission Control Protocol (TCP) acknowledgement) containing a new size of the receive window to the sender.

In some embodiments, the network link is one of a WiFi network link or a mobile phone network link. For example, the network link may be provided by a wireless access point for the WiFi network and/or a cell tower for the mobile phone network.

In some embodiments, the receive window is not reduced below a minimum receive window associated with sampling of the network link.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data. Note that the described embodiments are not intended to include non-transitory computer-readable storage mediums such as transitory signals.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices. When the hardware modules or apparatus are activated, they perform the methods and processes included within them.

Figure 1:
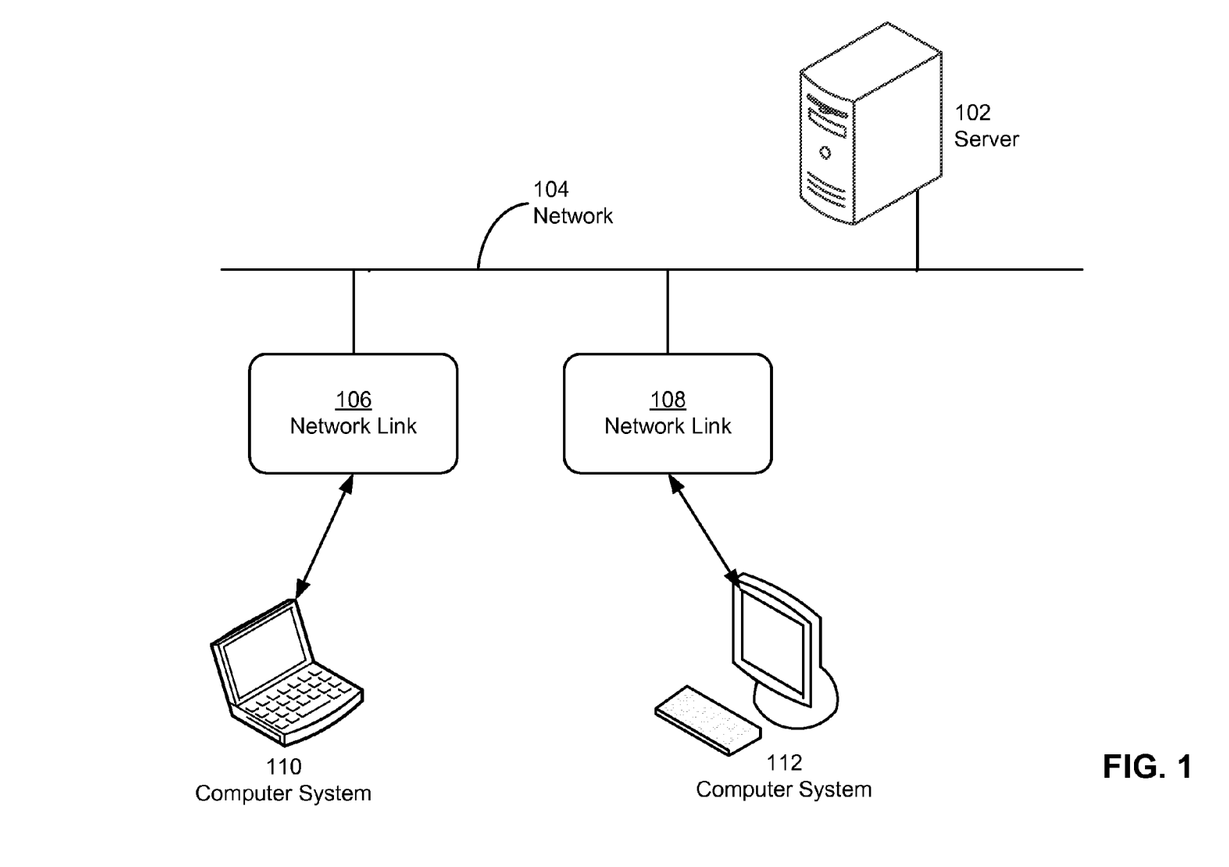
FIG. 1 shows a schematic of a system in accordance with the disclosed embodiments.

The disclosed embodiments provide a method and system for managing network traffic. As shown in FIG. 1, a number of computer systems 110-112 are connected to a network 104 through network links 106-108 provided by devices such as wireless access points, cell towers, and/or routers. Computer systems 110-112 may correspond to a personal computer, laptop computer, tablet computer, mobile/smart phone, portable media player, and/or other network-enabled electronic device. Network 104 may include a local area network (LAN), wide area network (WAN), personal area network (PAN), virtual private network, intranet, mobile phone network (e.g., a cellular network), WiFi network, Bluetooth network, universal serial bus (USB) network, Ethernet network, an ad hoc network formed between two or more devices, and/or other type of network that facilitates communication among computer systems (e.g., computer systems 110-112) connected to network 104.

In particular, computer systems 110-112 may interact with one another and/or a server 102 on network 104 by sending and receiving data such as files, audio, video, and/or web content over network 104. For example, computer system 110 may request data from computer system 112 and/or server 102 by establishing Transmission Control Protocol (TCP) connections with computer system 112 and/or server 102. Computer system 112 and server 102 may then provide the requested data by transmitting a sequence of packets containing the data over network 104 to computer system 110. At the same time, computer systems 110-112 and/or other computer systems (not shown) may communicate with one another, server 102, and/or other servers or devices (not shown) on network 104 by transmitting and receiving packets over network 104. To prevent and/or mitigate congestion on network, network links 106-108 and/or other network links (not shown) on network 106 may implement network traffic control techniques that queue, reorder, delay, and/or drop packets to computer systems 110-112 and/or the other computer systems. Computer systems 110-112, server 102, and/or the other servers or devices may also adjust the rate of transmission of subsequent packets based on packet errors, losses, and/or delays, thus facilitating sharing of available bandwidth and/or effective use of network 104 by the computer systems.

However, conventional computer systems (e.g., smart phones, desktops computers, tablet computers, etc.) may lack the ability to control the receipt of packets from one another and/or the servers. In addition, each computer system may include a number of processes associated with different priorities that send and receive data over network 104. As a result, the network link (e.g., network links 106-108) to which the computer system (e.g., computer systems 110-112) is connected may be under contention, and higher-priority processes on the computer system may receive less bandwidth from the network link than lower-priority processes. Along the same lines, packets destined for the computer system may encounter a bottleneck at the network link, and all processes on the computer system may experience increased network latency.

To facilitate use of network links 106-108 (and to avoid the above-described problems encountered in conventional computer systems), in the described embodiments, computer systems 110-112 include functionality for adjusting the transmission of packets from one another, server 102, and/or other computer systems or devices to individual processes on computer systems 110-112 based on the network latencies experienced by the processes.

Figure 2:
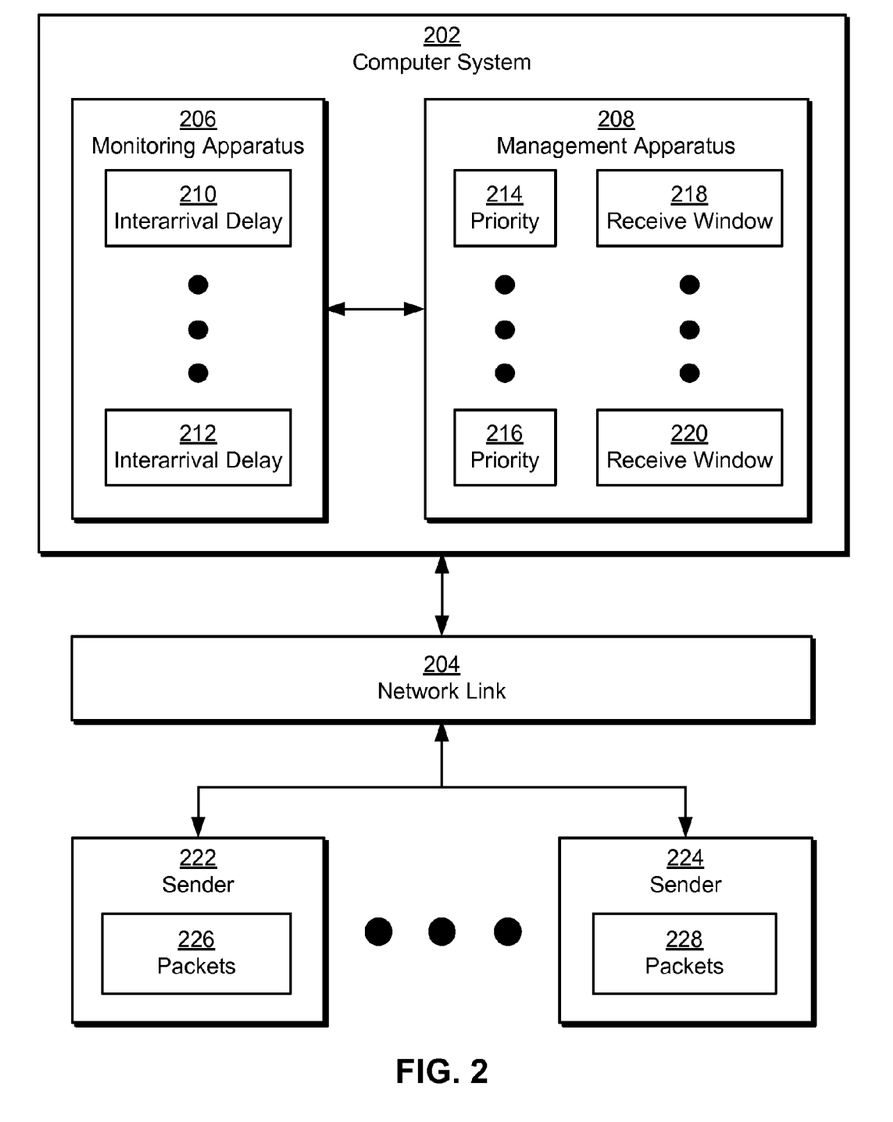
FIG. 2 shows a system for facilitating use of a network link in accordance with the disclosed embodiments.

As shown in FIG. 2, a computer system 202 may receive packets 226-228 from multiple senders 222-224 (e.g., servers or other devices) over a network link 204. Packets 226-228 may be associated with different processes (e.g., applications) executing on computer system 202. For example, packets 226 from sender 222 may be received by one process on computer system 202, and packets 228 from sender 224 may be received by another process on computer system 202.

While packets 226-228 are transmitted from senders 222-224 to computer system 202, a monitoring apparatus 206 in computer system 202 may continuously monitor a set of interarrival delays 210-212 for packets 226-228. In particular, monitoring apparatus 206 may calculate each interarrival delay 210-212 as the difference in "relative transit time" for a pair of consecutive packets from a sender to the corresponding process on computer system 202. For example, if two packets are sent 20 milliseconds apart but received 30 milliseconds apart, the interarrival delay for the two packets may be 10 milliseconds.

The calculated interarrival delays 210-212 may provide computer system 202 with an indication of competition between processes on a network link 204 such as a wireless access point on a WiFi network and/or a cell tower on a mobile phone network. To further facilitate detection of changes to network traffic from senders 222-224, monitoring apparatus 206 may also calculate statistical values such as a standard deviation and/or variance of interarrival delays 210-212 (e.g., interarrival jitter).

Next, a management apparatus 208 in computer system 202 may adjust a set of receive windows 218-220 for senders 222-224 based on interarrival delays 210-212 to facilitate receipt of subsequent packets from senders 222-224 over network link 204. Each receive window 218-220 may represent the amount of data computer system 202 is willing to accept from the corresponding sender without acknowledging (e.g., transmitting an acknowledgement packet to) the sender. A wide receive window may raise the rate of packet transmission from the sender, while a narrow receive window may lower the rate of packet transmission from the sender.

If an interarrival delay of packets from a sender exceeds a threshold by a first pre-specified margin, network link 204 may be under contention, and management apparatus 208 may reduce the corresponding receive window to decrease the interarrival delay of subsequent packets from the sender and/or other senders (e.g., senders 222-224). On the other hand, if the interarrival delay falls below the threshold by a second pre-specified margin, which may or may not be the same as the first pre-specified margin, network link 204 may be underutilized, and management apparatus 208 may increase the receive window to increase a utilization of the network link. To effect the change in receive window for the sender, management apparatus 208 may transmit a packet or data frame to the receiver to indicate the new size of the receive window. For example, in some embodiments, the management apparatus transmits an acknowledgement packet (e.g., TCP acknowledgement) containing a new size of the receive window to the sender, and the sender may accordingly adjust the rate at which packets are transmitted to computer system 202.

Management apparatus 208 may further adjust receive windows 218-220 based on a set of priorities 214-216 for the processes to which the packets are destined (e.g., where the priority for a given process is specified by an operating system for computer system 202). If the processes are associated with different priorities 214-216, management apparatus 208 may scale adjustments to receive windows 218-220 based on priorities 214-216. Management apparatus 208 may thus ensure that higher-priority processes are associated with wider receive windows and, in turn, more bandwidth on network link 204, than lower-priority processes.

For example, a background (e.g., low-priority) process on computer system 202 may be the sole receiver of network traffic over network link 204. As a result, all packets transmitted over network link 204 to computer system 202 may be received by the background process, and the background process may experience minimal interarrival delay and/or variations in interarrival delay between pairs of packets. However, once a foreground (e.g., high-priority) process on computer system 202 begins receiving packets over network link 204, the background process may experience an increase in both interarrival delay and variance in interarrival delay. The interarrival delay may eventually exceed a pre-specified threshold, indicating the use of network link 204 by the competing foreground process.

To prioritize use of network link 204 by the foreground process, management apparatus 208 may reduce the receive window of the background process, thus throttling network traffic to the background process. If the interarrival delay remains over the threshold, management apparatus 208 may continue reducing the background process's receive window until the interarrival delay has dropped and/or the receive window reaches a minimum receive window (e.g., a receive window of four packets). In some embodiments, the minimum receive window can be the minimum receive window for sampling network link 204.

After the foreground process has finished using network link 204, the background process may experience a decrease in interarrival delay, which may eventually result in the interarrival delay falling below the threshold. Management apparatus 208 may then increase the receive window of the background process to increase utilization of network link 204 until the interarrival delay returns to an acceptable value. Changes to interarrival delays, receive windows, and/or packet arrivals over time are discussed in further detail below with respect to FIGS. 3-6.

By adjusting receive windows 218-220 based on interarrival delays 210-212 and/or priorities 214-216, monitoring apparatus 206 and management apparatus 208 may enable sharing and/or prioritization of network bandwidth among processes on computer system 202 without requiring changes to protocols (e.g., TCP) used to transmit packets 226-228 from senders 222-224 over network link 204 to computer system 202. Furthermore, monitoring apparatus 206 and management apparatus 208 may maximize utilization of network link 204 by processes on computer system 202 by enabling full access to network link 204 for a process whenever there is no competition for network link 204 on computer system 202.

Those skilled in the art will appreciate that the system of FIG. 2 may be implemented in a variety of ways. First, monitoring apparatus 206 and management apparatus 208 may track interarrival delays 210-212 and adjust receive windows 218-220 on an individual or a group basis. For example, each process in computer system 202 may be associated with a separate instance of monitoring apparatus 206 and management apparatus 208, or network traffic for all processes in computer system 202 may be monitored and managed by a single, centralized monitoring apparatus 206 and/or management apparatus 208 (e.g., in the operating system of computer system 202). Similarly, monitoring apparatus 206 and management apparatus 208 may be provided by the same software and/or hardware component, or monitoring apparatus 206 and management apparatus 208 may execute independently from one another. For example, monitoring apparatus 206 and management apparatus 208 may be implemented by one or more dedicated processors and/or general-purpose processors (e.g., central-processing units (CPUs)) on computer system 202.

Second, management apparatus 208 may manage network traffic for the processes in a number of ways. For example, management apparatus 208 may implement a black-and-white prioritization technique, in which receive windows for only low-priority (e.g., background) processes are adjusted based on interarrival delays of the low-priority processes, and wide receive windows are maintained for high-priority (e.g., foreground) processes regardless of the interarrival delays of the high-priority processes, as described in the above example. Alternatively, management apparatus 208 may scale the adjustments to the receive windows based on the priorities of the processes, with adjustments to receive windows for lower priority processes receiving greater weight than adjustments to receive windows for higher priority processes. Management apparatus 208 may further influence the adjustments by using different systems to represent the processes' priorities, including numeric scales (e.g., 1 to 5, 1 to 10, etc.), alphabetic letters (e.g., A, B, C, etc.), and/or priority classes (e.g., idle, normal, high, real-time). Finally, management apparatus 208 may use different thresholds and/or margins for triggering changes to receive windows 218-220 to increase or decrease the sensitivity and/or responsiveness of computer system 202 to changes in interarrival delays 210-212.

Figure 3:
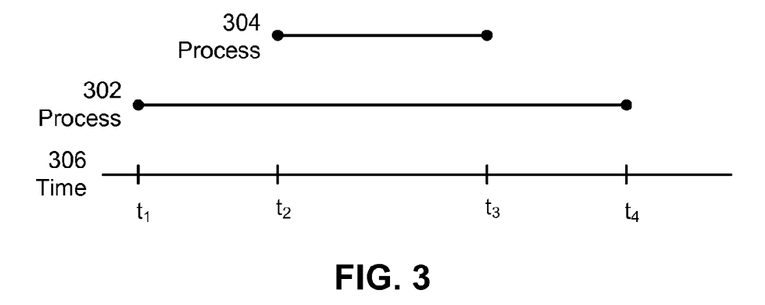
FIG. 3 shows an exemplary use of a network link by two processes over time in accordance with the disclosed embodiments.

FIG. 3 shows an exemplary use of a network link by two processes 302-304 over time 306 in accordance with the disclosed embodiments. Process 302 may be a lower-priority (e.g., background) process, and process 304 may be a higher-priority (e.g., foreground) process. At time $t_1$, process 302 may begin transmitting and receiving packets over the network link. Next, at time $t_2$, process 304 may begin using the network link, thus sharing the network link with process 302. At time $t_3$, process 304 may stop using the network link, and at time $t_4$, process 302 may stop using the network link.

Figure 4:
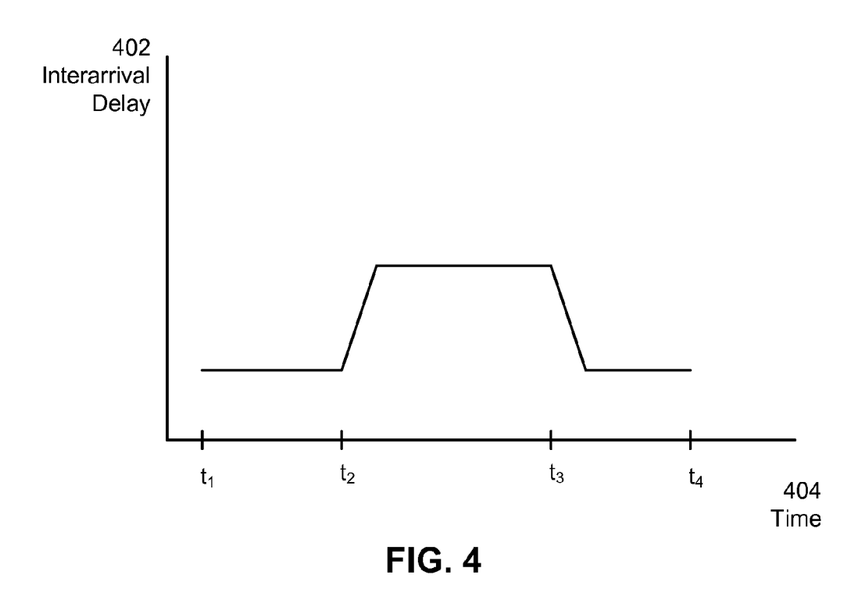
FIG. 4 shows an exemplary plot in accordance with the disclosed embodiments.
Figure 5:
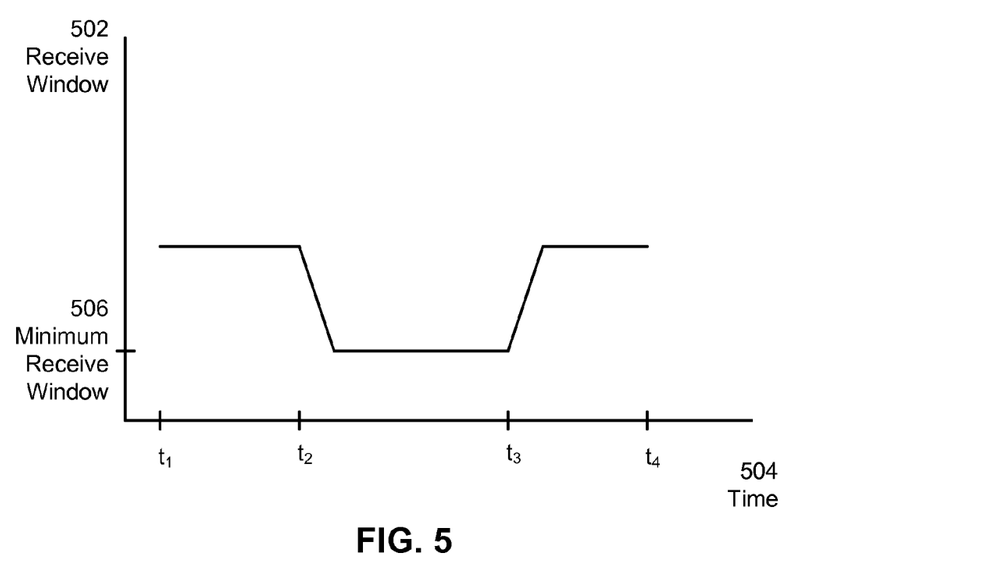
FIG. 5 shows an exemplary plot in accordance with the disclosed embodiments.
Figure 6:
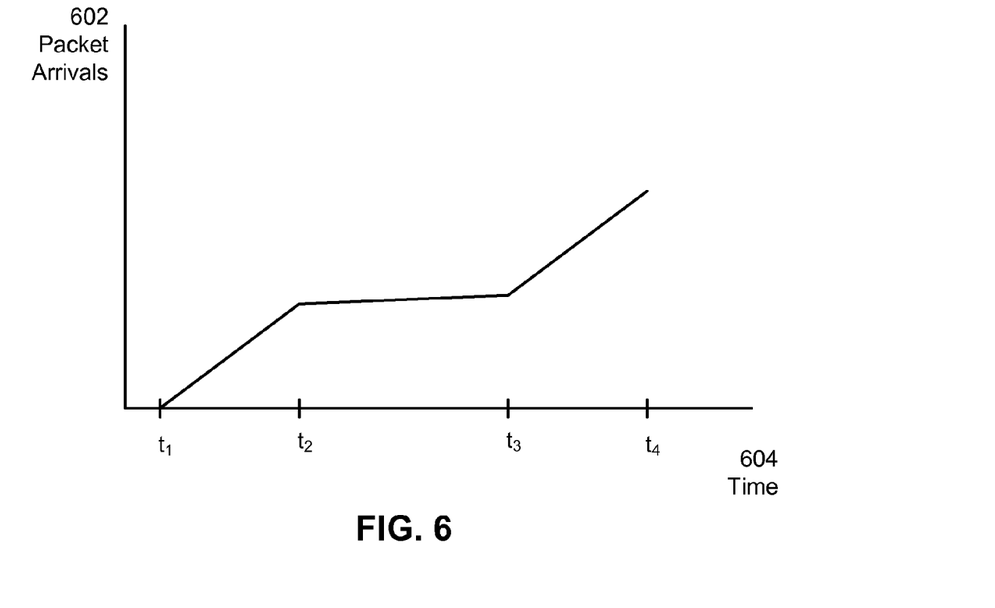
FIG. 6 shows an exemplary plot in accordance with the disclosed embodiments.

FIGS. 4-6 show exemplary plots in accordance with the disclosed embodiments. More specifically, FIG. 4 shows a plot of interarrival delay 402 for process 302 from FIG. 3 as a function of time 404, FIG. 5 shows a plot of a receive window 502 for process 302 as a function of time 504, and FIG. 6 shows a plot of packet arrivals 602 for process 302 as a function of time 604.

Between times $t_1$ and $t_2$, process 302 is the only user of the network link, and interarrival delay 402 remains relatively constant and low. Similarly, receive window 502 for process 302 is set to a default value, and packet arrivals 602 indicate that packets are being received over the network link at a steadily high rate by process 302.

Once process 304 begins using the network link at time $t_2$, interarrival delay 402 for process 302 increases. To offset the increase in interarrival delay 402, receive window 502 for process 302 may be steadily reduced until a minimum receive window 506 is reached. For example, receive window 502 may be reduced for process 302 in a single step (e.g., directly to minimum receive window 506) or in a series of steps (e.g., incrementally until minimum receive window 506 is reached). Receive window 502 for process 302 may then be maintained at minimum receive window 506 to enable the continued sampling of packets from the network link and the calculation of interarrival delay 402 using the packets. For example, receive window 502 may have a floor (e.g., minimum receive window 506) of four packets to facilitate subsequent adjustments to receive window 502 for process 302 based on calculations of interarrival delay 402 for process 302 from each set of four packets received over the network link. While receive window 502 for process 302 is set to minimum receive window 506, interarrival delay 402 for process 302 may stabilize, and packet arrivals 602 for process 302 may increase at a much slower rate because receive window 502 has throttled network traffic for process 302.

Between times $t_3$ and $t_4$, interarrival delay 402 for process 302 may decrease because the network link is no longer shared by processes 302-304. Interarrival delay 402 for process 302 may also flatten out at the initial low value associated with sole use of the network link (e.g., between times $t_1$ and $t_2$). At the same time, receive window 502 for process 302 may be increased in response to the decrease in interarrival delay 402 until the initial value for receive window 502 is reached. As with the previous decrease of receive window 502 for process 302 to minimum receive window 506, receive window 502 may be increased to the initial value incrementally and/or in a single step. Similarly, packet arrivals 602 for process 302 may pick up until the packets are being received at the same high rate as the packet arrival rate from $t_1$ to $t_2$. In other words, packets associated with process 302 may initially fully utilize the network link, slow during sharing of the network link with process 302, and resume full utilization of the network link once process 304 has finished using the network link.

Figure 7:
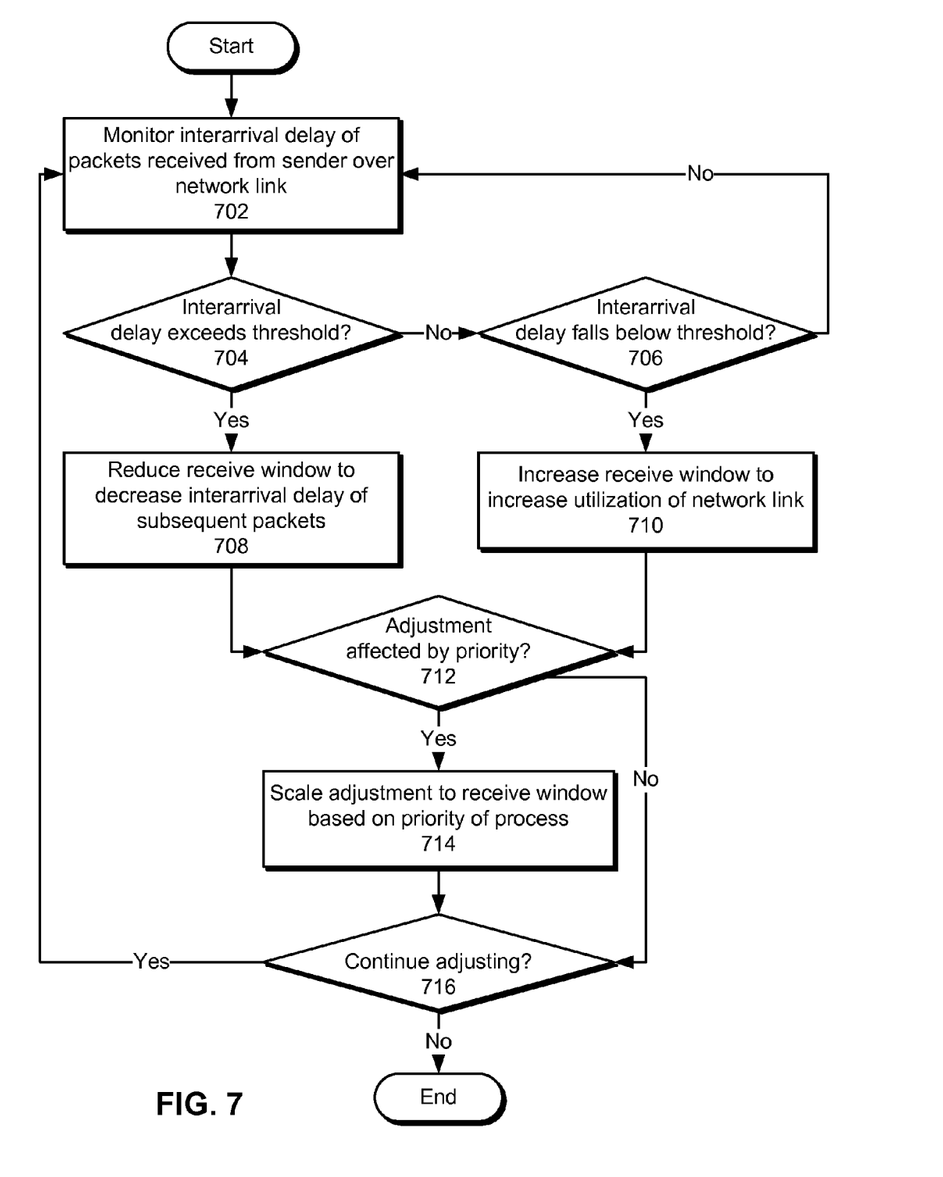
FIG. 7 shows a flowchart illustrating the process of facilitating use of a network link in accordance with the disclosed embodiments.

FIG. 7 shows a flowchart illustrating the process of facilitating use of a network link in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the technique.

Initially, an interarrival delay of packets received from a sender over a network link is monitored (operation 702). The network link may be associated with a WiFi network and/or a mobile phone network. For example, the network link may correspond to a wireless access point for the WiFi network and/or a cell tower for the mobile phone network. The interarrival delay may be calculated for two or more consecutive packets received from the network link as the difference in "relative transit time" for the packets.

Next, a receive window for the sender may be adjusted based on the exceeding and/or falling below of a threshold by the interarrival delay (operations 704-706) to facilitate receipt of subsequent packets from the sender and/or other senders over the network link. The receive window may correspond to the amount of data the sender may transmit without receiving an acknowledgement (e.g., TCP acknowledgement) from a receiver of the data.

If the interarrival delay neither exceeds nor falls below the threshold (e.g., by more than a pre-specified margin), monitoring of the interarrival delay may continue (operation 702) to enable the detection of values of the interarrival delay that do exceed and/or fall below the threshold. If the interarrival delay exceeds the threshold, the receive window is reduced to decrease the interarrival delay of the subsequent packets (operation 708). For example, the receive window may be reduced to reduce the network bandwidth available for receiving packets from the sender, and in turn, the amount of competition on the network link. If the interarrival delay falls below the threshold, the receive window is increased to increase the utilization of the network link (operation 710). For example, the receive window may be increased to enable full utilization of the network link after competition for the network link has ceased. Note that, although we describe a single threshold and/or a single pre-specified margin, two (or more) different thresholds and/or pre-specified margins could be used in the described embodiments. For example, in some embodiments, a single threshold is used, but a first pre-specified margin is used for exceeding the threshold, and a second pre-specified margin is used for falling below the threshold.

Adjustments to the receive window may also be affected by the priority (operation 712) of a process associated with (e.g., receiving) the packets. For example, greater adjustments to the receive window may be made to a process with lower priority (e.g., a background process) than to a process with higher priority (e.g., a foreground process). If the adjustment is not affected by priority, the adjustment is applied to the receive window without further modification. If the adjustment is affected by the process's priority, the adjustment is scaled based on the priority (operation 714). After all adjustments to the receive window have been made, the adjustments may be effected by transmitting an acknowledgement packet containing the new size of the receive window to the sender.

Adjustments to the receive window may continue (operation 716) during receipt of the packets from the sender over the network link. If adjustments to the receive window are to continue, the interarrival delay of the packets is continuously monitored (operation 702), and the receive window for the sender is adjusted based on the interarrival delay of the packets and/or the priority of the process associated with the packets (operations 704-714). Adjustments to the receive window and/or the flow of network traffic over the network link may continue until the network link is no longer used to receive packets from the sender. Note that "continuous" monitoring can mean periodically monitoring or monitoring according to a predetermined schedule (e.g., in accordance with network traffic levels, etc.).

Figure 8:
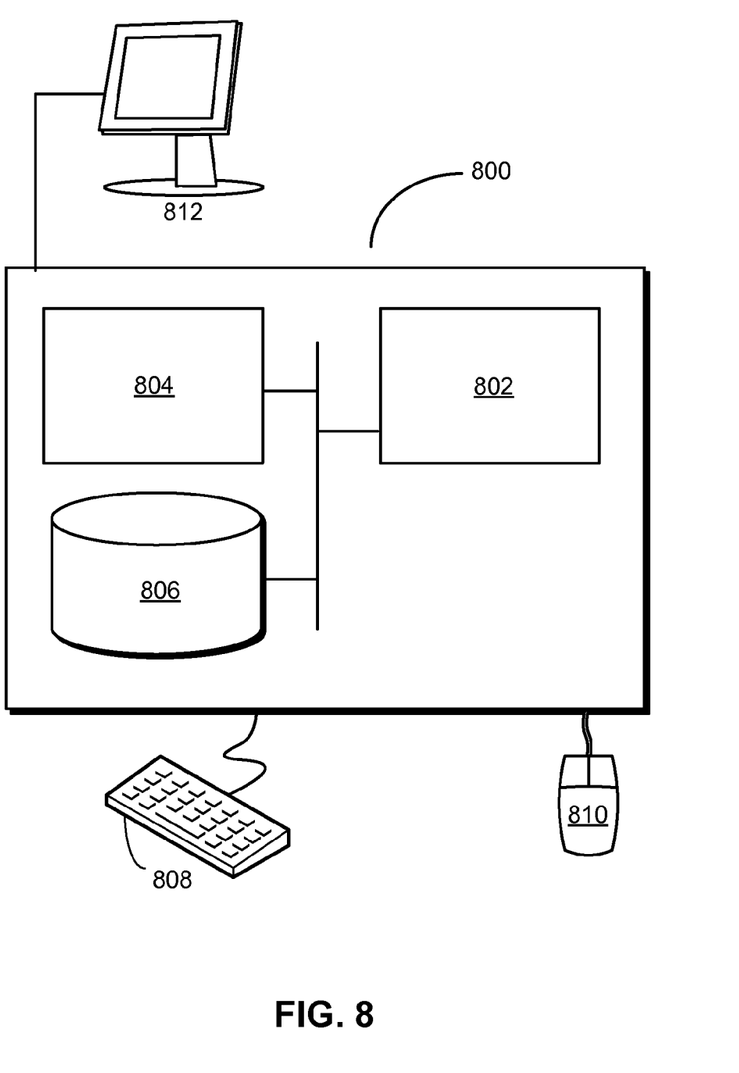
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for facilitating use of a network link. The system may include a monitoring apparatus that continuously monitors an interarrival delay of packets received from a sender over the network link. The system may also include a management apparatus that adjusts a receive window for the sender based on the interarrival delay to facilitate receipt of subsequent packets from the sender and other senders over the network link. The management apparatus may also adjust the receive window based on a priority of a process associated with the packets.

In addition, one or more components of computer system 800 may be remotely located and connected to the other components over a network. Portions of the present embodiments (e.g., monitoring apparatus, management apparatus, etc.) may also be located on different nodes of a distributed system that implements the embodiments. For example, the present embodiments may be implemented using a remote network traffic control system that monitors interarrival delays for processes in a set of remote computer systems and adjusts the receive windows for the processes based on the interarrival delays and/or the priorities of the processes.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating use of a network link, comprising:
    monitoring an interarrival delay of packets received from a sender over the network link, wherein the interarrival delay corresponds to differences in transit times for the packets from the sender over the network link; and
    adjusting a receive window for the sender based on the interarrival delay to facilitate receipt of subsequent packets from the sender and other senders over the network link.

2. The method of claim 1, further comprising:
    further adjusting the receive window based on a priority of a process associated with the packets.

3. The method of claim 2, wherein the process is a foreground process or a background process.

4. The method of claim 2, wherein adjusting the receive window based on the priority of the process involves:
    scaling an adjustment to the receive window based on the priority of the process.

5. The method of claim 1, wherein adjusting the receive window for the sender based on the interarrival delay involves:
    if the interarrival delay exceeds a threshold by a first pre-specified margin, reducing the receive window; and
    if the interarrival delay falls below the threshold by a second pre-specified margin, increasing the receive window.

6. The method of claim 1, wherein adjusting the receive window for the sender involves:
    transmitting an acknowledgement packet containing a new size of the receive window to the sender.

7. The method of claim 1, wherein the network link is one of a WiFi network link or a mobile phone network link.

8. The method of claim 1, wherein the receive window is not reduced below a minimum receive window associated with sampling of the network link.

9. The method of claim 1, wherein monitoring the interarrival delay of packets received from the sender comprises determining statistical values for the interarrival delay of a plurality of packets; and
    wherein adjusting the receive window for the sender based on the interarrival delay comprises adjusting the receive window based at least in part on the statistical values.

10. The method of claim 9, wherein the statistical values comprise an interarrival jitter.

11. A system for facilitating use of a network link, comprising:
    a monitoring apparatus configured to monitor an interarrival delay of packets received from a sender over the network link; and
    a management apparatus configured to adjust a receive window for the sender based on the interarrival delay to facilitate receipt of subsequent packets from the sender and other senders over the network link.

12. The system of claim 11, wherein the management apparatus is further configured to:
    further adjust the receive window based on a priority of a process associated with the packets.

13. The system of claim 12, wherein the process is a foreground process or a background process.

14. The system of claim 12, wherein adjusting the receive window based on the priority of the process involves:
    scaling an adjustment to the receive window based on the priority of the process.

15. The system of claim 11, wherein adjusting the receive window for the sender based on the interarrival delay involves:
    if the interarrival delay exceeds a threshold by a first pre-specified margin, reducing the receive window; and
    if the interarrival delay falls below the threshold by a second pre-specified margin, increasing the receive window.

16. The system of claim 11, wherein adjusting the receive window for the sender involves:
    transmitting an acknowledgement packet containing a new size of the receive window to the sender.

17. The system of claim 11, wherein the receive window is not reduced below a minimum receive window associated with sampling of the network link.

18. A non-transitory computer-readable storage medium storing instructions that when executed by a computer cause the computer to perform a method for facilitating use of a network link, the method comprising:
    monitoring an interarrival delay of packets received from a sender over the network link; and
    adjusting a receive window for the sender based on the interarrival delay to facilitate receipt of subsequent packets from the sender and other senders over the network link.

19. The computer-readable storage medium of claim 18, the method further comprising:
    further adjusting the receive window based on a priority of a process associated with the packets.

20. The computer-readable storage medium of claim 19, wherein the process is a foreground process or a background process.

21. The computer-readable storage medium of claim 19, wherein adjusting the receive window based on the priority of the process involves:
    scaling an adjustment to the receive window based on the priority of the process.

22. The computer-readable storage medium of claim 18, wherein adjusting the receive window for the sender based on the interarrival delay involves:
    if the interarrival delay exceeds a threshold by a first pre-specified margin, reducing the receive window; and if the interarrival delay falls below the threshold by a second pre-specified margin, increasing the receive window.

23. The computer-readable storage medium of claim 18, wherein adjusting the receive window for the sender involves:
transmitting an acknowledgement packet containing a new size of the receive window to the sender.

24. The computer-readable storage medium of claim 18, wherein the receive window is not reduced below a minimum receive window associated with sampling of the network link.

* * * * *